Figure 1:
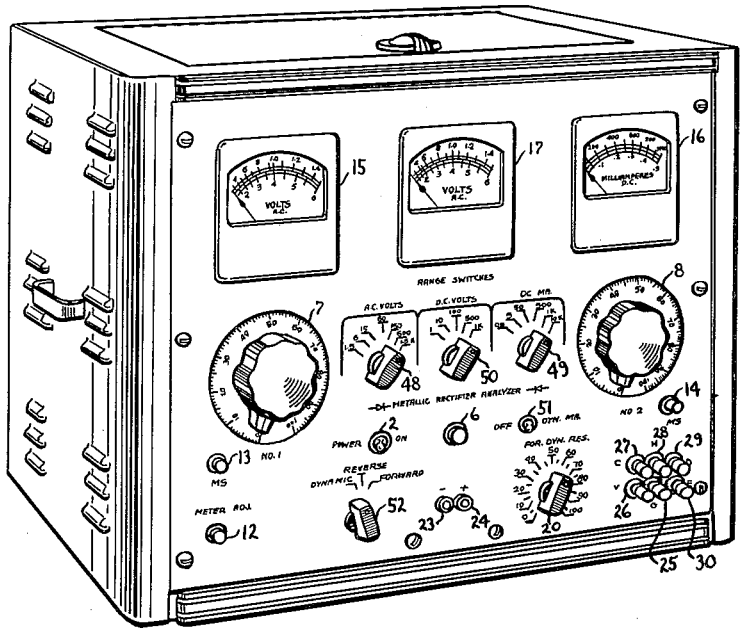

March 21, 1961 R. S. PAGE 2,976,488
METALLIC RECTIFIER ANALYZER
Filed Sept. 11, 1958 2 Sheets-Sheet 1

INVENTOR.
ROBERT S. PAGE

BY Charles L. Lovercheck

ATTORNEY

INVENTOR.
ROBERT S. PAGE

1
United States Patent Office 2,976,488
Patented Mar. 21, 1961

2

2,976,488

METALLIC RECTIFIER ANALYZER

Robert S. Page, 1224 Idaho Ave., Erie, Pa.

Filed Sept. 11, 1958, Ser. No. 760,494

2 Claims. (Cl. 324—158)

This invention relates to electronic equipment and, more particularly, to devices for testing rectifiers and the like.

With the advent of the new silicon rectifiers which are used not only for replacing vacuum tubes many times their size and weight but, also, for replacing selenium rectifiers which are much larger than the vacuum tubes, there has become a vast market for these new rectifiers. There is a great need for metallic rectifiers. The radio and television units utilize a large number of rectifiers in the country, to say nothing of the military and industrial uses; however, the customer or user of the rectifier does not pay for the rectifier manufacture alone but a large percentage of the cost of the metallic rectifier includes the expense of testing thereof. As specifications for precision rectifiers increase, costs of testing thereof increase accordingly. The invention disclosed herein makes it possible to perform high precision tests rapidly and at a low cost and, therefore, the overall cost of the rectifiers is reduced.

When the invention disclosed herein was conceived, no commercial test equipment was available for testing metallic power rectifiers. There was available, however, a forward voltage test circuit and a reverse current leakage test circuit which manufacturers built separately for the specific size selenium rectifier to be tested. These specific circuits could not be used to test any size rectifier except that for which they were specifically designed.

Further, two operators were required to carry out the forward and reverse tests, one to conduct the forward and one to conduct the reverse test. One operator would make one test on a rectifier and then pass the rectifier on to the other operator for the second test. The two tests performed by the operators were both static tests; that is, the rectifiers were not tested under load. To the knowledge of the inventor hereof, no commercial metallic rectifier tester has ever appeared which could perform both dynamic and static tests.

The analyzer disclosed herein has complete versatility and accuracy for laboratory, design, and development engineering testing of metallic rectifiers and, also, for production testing at a high production rate. The tester disclosed herein is capable of performing five tests which are:

(1) Visual presentation of the dynamic voltage current characteristic curve when connected to an external oscilloscope;
(2) Dynamic reverse current leakage test;
(3) Dynamic forward voltage drop test;
(4) Static reverse current leakage test; and
(5) Static forward voltage test.

The analyzer disclosed herein has the advantage of extreme accuracy required for the finest engineering laboratory testing equipment and, at the same time, is specifically designed for use in testing at a high production rate which is an essential to "quality control" for analyzing metallic rectifiers before installation in the consumer product line. The analyzer performs both the reverse current leakage test and the forward voltage drop test efficiently and accurately on all rectifiers of the usual size. A wafer selector switch connects the direct combination of voltages, circuits, and meters for the tests to be performed, thereby reducing possible error and instrument damage. The milliammeter range switch is used to select the current range desired for all five tests, depending on the rating of the metallic rectifier being analyzed.

The analyzer has an added safety feature of two microswitches used as interlocks to be operated simultaneously which will utilize both of the operator's hands and thereby assure absolute safety since the operator will have to use both hands to hold the switches and, therefore, will not inadvertently be in contact with a part of the electrical circuit.

More specifically, it is an object of this invention to improve prior instruments for testing metallic rectifiers and, particularly, it is an object of the invention to provide an analyzer for testing metallic rectifiers which is simple in construction, economical to manufacture, and simple, efficient, and safe to operate.

Another object of the invention is to provide an improved analyzer for testing metallic rectifiers.

A further object of the invention is to provide an improved analyzer for testing metallic rectifiers which is capable of testing rectifiers with high accuracy and, at the same time, at a high production rate.

A still further object of this invention is to provide an improved analyzer wherein both static and dynamic tests can be performed on silicon, selenium, germanium, and other metallic rectifiers.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 6:
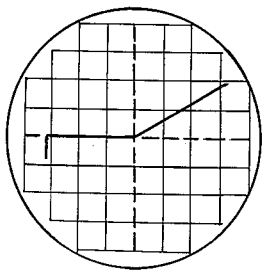
Figure 7:
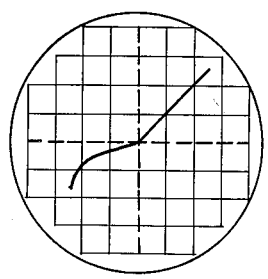
Figure 8:
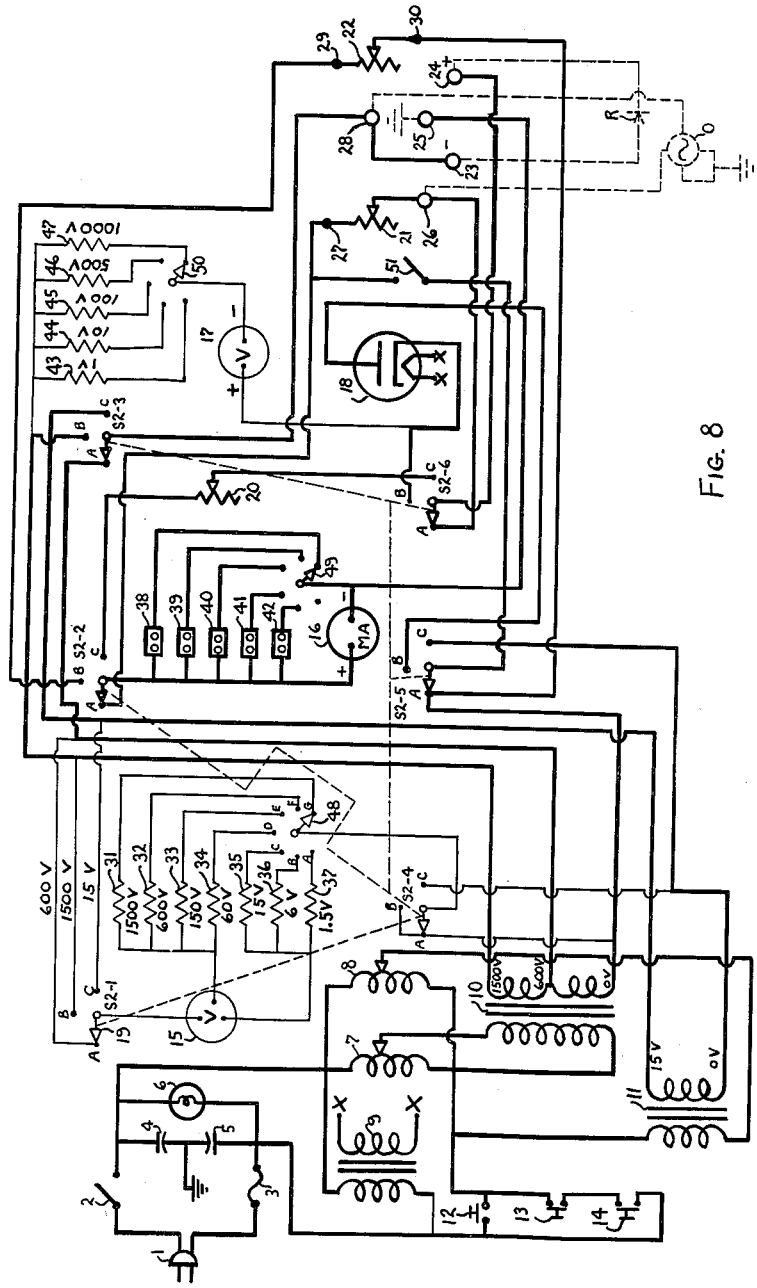

In the drawings:

Fig. 1 is an isometric view of a tester according to the invention;

Figs. 2 to 7 inclusive show oscilloscope presentations of the dynamic voltage current characteristic test on the rectifiers; and Fig. 8 is a view of the electrical circuit of the analyzer.

Now with more specific reference to the drawings, an A.C. plug 1 for insertion into an alternating current outlet which will preferably be a 117 volts A.C. 60 cycles is shown. An A.C. line switch 2 is provided for controlling power to the instrument and a fuse 3 is provided for protection of the instrument. Line bypass capacitors 4 and 5 filter out extraneous voltages and perform the general functions of an electronic filter. A pilot light 6 provides a visual indication when the instrument power is turned on.

A variable autotransformer 7 provides a control for the amount of line voltage on a transformer 10. A variable autotransformer 8 provides control of the voltage on a transformer 11. A filament transformer 9 supplies heater voltage for the filaments of a tube 18.

The transformer 10 supplies voltage and current for the visual dynamic voltage current characteristic test, the dynamic reverse flow current leakage test, and the static reverse current leakage test. The transformer 11 supplies voltage and current for the dynamic forward voltage test and the static forward voltage test.

A push button switch 12 may be used while adjusting the variable autotransformers 7 and 8 and range switches are used to set up the proper test voltages and currents.

The switch 12 has a strong spring and the operator will be discouraged from using this repeatedly during production tests and he will use switches 13 and 14, requiring both hands.

The micro push button switch 13 is connected for energizing the test circuits and providing safety to the operator by requiring simultaneous operation of this switch with the micro push button switch 14 during use of the instrument so that both hands of the operator must be in use during the test and neither hand can be electrically injured.

An A.C. iron vane volt meter 15 provides a means for measuring the alternating current potential applied to the rectifier under test which may be connected across the terminals 23 and 24. A D.C. permanent magnet moving coil type D.C. milliammeter 16 is provided for measuring the direct current flowing in the circuit of the rectifier under test connected to the terminals 23 and 24. A D.C. volt meter 17 is a high impedance instrument having at least 20,000 ohms per volt and is used for measuring the direct current potential applied to the rectifier under test during the reverse current leakage test. It is important to have the high impedance volt meter 17 for testing signal diodes.

The half wave rectifier 18 may be a 6AU4 type vacuum tube or any other suitable rectifier and is provided for changing A.C. to D.C. for the reverse current leakage test. A main selector switch 19 is provided for selecting the correct transformers and other circuits for each of the respective tests. A rheostat 20 is provided for use during the dynamic forward voltage drop test to allow selection of proper resistance required. A rheostat 21 is provided for use during the visual dynamic voltage current characteristic test to be adjusted to such value as required for proper load and it will have the proper size for the type of metallic rectifiers to be tested. A rheostat 22 is provided for the dynamic reverse current leakage test and should be of such value as required for proper load and size and type of metallic rectifier to be tested.

The negative test terminal 23 is provided to receive the adapter or test leads for connection to the metallic rectifiers to be tested. A ground terminal 25 is provided for the oscilloscope connection for visual presentation of the dynamic voltage current characteristic curve. A terminal 26 is provided for the vertical terminal of the externally connected oscilloscope for visual presentation of the dynamic voltage current characteristic curve. A terminal 28 is provided for the horizontal terminal of the oscilloscope for use during the visual presentation of the dynamic voltage current characteristic curve.

A multiplier resistance 31 is provided for the 1,500 volt range of the A.C. iron vane volt meter 15. A multiplier resistance 32 is provided for the 600 volt range of the A.C. volt meter 15 and a multiplier resistance 33 is provided for the 150 volt range of the A.C. volt meter 15. A multiplier resistance 34 is provided for the 60 volt range of the volt meter 15 and a multiplier resistance 35 is provided for the 15 volt range of the volt meter 15. A multiplier resistance 36 is provided for the 6 volt range of the volt meter 15 and a multiplier resistance 37 is for the 1½ volt range of the A.C. iron volt meter 15.

A shunt resistance 38 is provided for the 10,000 milliampere range of the D.C. milliammeter 16 and a shunt resistance 39 is for the 1,000 milliampere range of the milliammeter 16. A shunt resistance 40 is provided for the 500 milliampere range of the D.C. milliammeter 16, a shunt resistance 41 is provided for the 50 milliampere range of the milliammeter 16, and a shunt resistance 42 is for the 5 milliampere range of the milliammeter 16. The milliammeter 16 itself has a .5 milliampere movement.

A multiplier resistance 43 is provided for the 1 volt range, a multiplier resistance 44 for the 10 volt range, a multiplier resistance 45 for the 100 volt range, a multiplier resistance 46 for the 500 volt range, and a multiplier resistance 47 for the 1,000 volt range of the D.C. volt meter 17.

A range switch 48 is provided for the selection of the required voltage range and range switches 49 and 50 for the A.C. and D.C. voltage range, respectively. A switch 51 is provided for shorting out the D.C. milliammeter 16 after the initial set up in the visual dynamic voltage current characteristic curve presentation.

A terminal 27 is a connection for the rheostat 21 during the visual presentation of the dynamic voltage current characteristic curve and a terminal 29 is provided for use in connecting the rheostat 22 during the dynamic reverse leakage current test. A terminal 30 is also provided for connection for the rheostat 22 during the dynamic reverse leakage current test.

A switch S2 is a six pole three position selector switch. The switch 48 selectively connects the multiplier resistances 31 to 37 selectively to the D.C. volt meter 15 to select the proper scale. The switch 49 selects the proper shunt resistances 38 to 42 for the milliammeter 16. A switch 50 selects the proper multiplier resistance for the D.C. volt meter 17.

Figure 2:
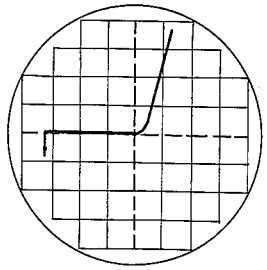
Figure 3:
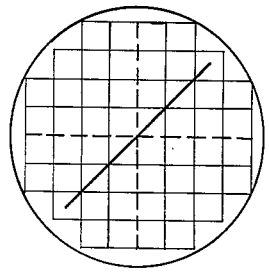
Figure 4:
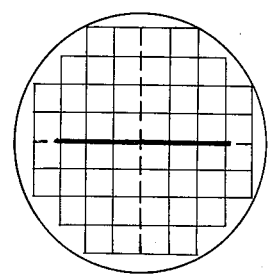
Figure 5:
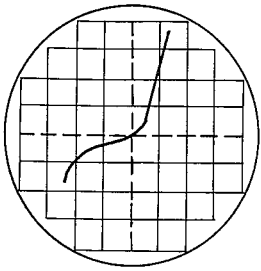

Fig. 2 shows the oscilloscope presentation of a rectifier which is of good quality. Fig. 3 shows an oscilloscope presentation of a rectifier which is shorted according to the test of the present instrument. Fig. 4 shows a presentation of a rectifier which is open according to the test of the present instrument. Fig. 5 shows a presentation of a rectifier wherein the reverse current leakage is improper. Fig. 6 shows an oscilloscope presentation taken with the present instrument wherein the forward voltage drop is poor. Sometimes this curve is observed with good metallic rectifiers and is caused by high resistance due to the oscilloscope vertical input attenuator position. Fig. 7 shows an oscilloscope presentation of a very bad metallic rectifier wherein its semi-conductor properties have nearly disappeared and it is approaching either a plain resistor or a direct short. It has a high forward resistance and a very poor blocking quality (high reverse current leakage) in the reverse direction.

The components shown herein by way of example may have the following values:

| Transformer: | Volts |
|---|---|
| 7 | 0–150 |
| 8 | 0–150 |
| 9 | 6.3 |
| 10 | 0–600–1500 |
| 11 | 15 |

| Rheostat: | Ohms |
|---|---|
| 20 | 0–100 |
| 21 | 0–5000 |
| 22 | 0–5000 |

| Resistance: | Meter scale volts |
|---|---|
| 31 | 1500 |
| 32 | 600 |
| 33 | 150 |
| 34 | 60 |
| 35 | 15 |
| 36 | 6 |
| 37 | 1.5 |
| 38 | 10000 |
| 39 | 1000 |
| 40 | 500 |
| 41 | 50 |
| 42 | 5 |
| 43 | 1 |
| 44 | 10 |
| 45 | 100 |
| 46 | 500 |
| 47 | 1000 |

It will be seen that with the main selector switch S2 in the A position, 600 volts A.C. from the transformer 10 is impressed on the rectifier connected through the terminal 27 to the terminals 23 and 24. This circuit is formed through the switch 51 if it be closed and, if open, it is through the milliammeter 16 for the dynamic voltage current characteristic test.

When the switch S2 is moved to the B position, approximately 750 volts D.C. from the transformer 10 is impressed on the terminals 24 and 23 at the reverse polarity through the rectifier 18. With the master selector switch S2 in the C position, the transformer 11 connects 15 volts A.C. through the rheostat 20 which acts as a load resistor across the rectifier for forward voltage drop.

The above tests become static or dynamic depending on whether the rheostats 20, 21, or 22 are set at zero or at a load position. The operator will set the load rheostats at the proper value before starting the dynamic tests.

The oscilloscope O is connected externally to the terminals 26 and 28 as shown and the rectifier R under test is connected by means of a convenient test block to the terminals 23 and 28.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An analyzer for performing both dynamic and static tests on metallic rectifiers comprising an adjustable source of alternating current, a six pole three position selector switch, each pole having three fixed terminals and a common terminal, a first and a second external terminal for connecting a rectifier to be tested, an alternating current volt meter, multiplier means for said alternating current volt meter, an A.C. multiplier switch to select said multiplier values, the first pole of said selector switch having a common terminal connected to said alternating current volt meter, the first fixed said terminal on said first pole of said selector switch being connected to a six hundred volt terminal on said alternating current source and to a first fixed terminal on a third pole of said selector switch, the common terminal of said third pole being connected to a terminal for connecting the horizontal connection of an oscilloscope thereto and one side of said rectifier under test, the sixth pole of said selector switch having its common terminal connected to the second terminal of said rectifier under test and having its first fixed terminal connected to a terminal adapted to be connected to the vertical sweep terminal of an oscilloscope, a variable load resistor connected to the first fixed terminal of said sixth pole at one end and to the first fixed terminal of the second pole of said selector switch at the other end, the common terminal of said second pole of said selector switch being connected to one side of a D.C. milliammeter, a shunt switch for connecting predetermined values of shunt resistances to said milliammeter to the common terminal of a fifth pole of said selector switch and said common terminal of said second pole of said selector switch being connected through said D.C. milliammeter to a common terminal on said fifth pole of said selector switch, the first fixed terminal of said fifth pole of said selector switch being connected to the opposite side of said six hundred volt alternating current source, the second fixed terminal on said first pole of said selector switch being connected to a fifteen hundred volt terminal of said alternating current source and to a plurality of multiplier resistances, said multiplier resistances being selectively connected to a second volt meter, a rectifier tube, said second volt meter having its other side connected to the second fixed terminal on said sixth pole of said selector switch and to the cathode of said rectifier tube, the anode of said rectifier tube being connected to a second fixed terminal on said fifth pole of said selector switch, a second variable resistor, the second fixed terminal on said second pole of said selector switch being connected through said second variable resistor to said low side of said power source, the second fixed terminal on the fourth pole of said selector switch being connected to the low side of said alternating current source, the third fixed terminal on said first pole of said selector switch being connected to a fifteen volt alternating current supply of electricity and to a third fixed terminal on the third pole of said selector switch, the third fixed terminal on said fifth pole being connected to the low side of said fifteen volt supply of electricity, the third fixed terminal of said sixth pole of said selector switch being connected through a variable resistance to the third fixed terminal on said second pole, the second fixed terminal on the first pole of said selector switch being connected to the second fixed terminal on the third pole of said selector switch, the first fixed terminal on the fourth pole of said selector switch being connected to said low side of said power source, the third fixed terminal on said fourth pole of said selector switch being connected to the third fixed terminal on said fifth pole of said selector switch, the common terminal of said fourth pole of said selector switch being connected to the common terminal on said A.C. multiplier switch.

2. The analyzer recited in claim 1 wherein autotransformers are provided for adjusting the voltage to said alternating current source of electricity.

References Cited in the file of this patent
UNITED STATES PATENTS 2,847,646    Marino    Aug. 12, 1958
2,849,682    Herr    Aug. 26, 1958